US012578351B2

(12) United States Patent
Kajihara et al.

(10) Patent No.: US 12,578,351 B2
(45) Date of Patent: Mar. 17, 2026

(54) AUTOMATIC ANALYZER

(71) Applicant: Hitachi High-Tech Corporation, Tokyo (JP)

(72) Inventors: Yuri Kajihara, Tokyo (JP); So Oguchi, Tokyo (JP); Taichiro Yamashita, Tokyo (JP); Yoshiaki Sugimura, Tokyo (JP); Aiko Miyakawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 725 days.

(21) Appl. No.: 17/915,325

(22) PCT Filed: Feb. 26, 2021

(86) PCT No.: PCT/JP2021/007264
§ 371 (c)(1),
(2) Date: Sep. 28, 2022

(87) PCT Pub. No.: WO2021/205771
PCT Pub. Date: Oct. 14, 2021

(65) Prior Publication Data
US 2023/0184793 A1      Jun. 15, 2023

(30) Foreign Application Priority Data
Apr. 8, 2020      (JP) ................................. 2020-069652

(51) Int. Cl.
*G01N 35/00*      (2006.01)
(52) U.S. Cl.
CPC .................. *G01N 35/00029* (2013.01); *G01N 2035/00128* (2013.01); *G01N 2035/00811* (2013.01)

(58) Field of Classification Search
CPC ........... G01N 35/00029; G01N 35/028; G01N 35/02; G01N 35/0098; G01N 35/0099
See application file for complete search history.

(56) References Cited

U.S. PATENT DOCUMENTS 5,089,424 A *    2/1992   Khalil ................ G01N 33/5764
                                                         422/562
5,128,019 A      7/1992   Karpf et al.
(Continued)

FOREIGN PATENT DOCUMENTS

CN    206292169 U    6/2017
JP    02-189446 A    7/1990
(Continued)

OTHER PUBLICATIONS

International Search Report, PCT/JP2021/007264, May 11, 2021, 3 pgs.

*Primary Examiner* — Matthew D Krcha
*Assistant Examiner* — Tingchen Shi
(74) *Attorney, Agent, or Firm* — Volpe Koenig

(57)            ABSTRACT

To provide an automatic analyzer with improved workability when a flow cell is loaded and unloaded. The automatic analyzer includes: a photomultiplier tube; a board disposed vertically below the photomultiplier tube; and a flow cell disposed vertically below the board. A lower surface of the board has a protrusion portion and/or a recess portion, and an upper surface of the flow cell has a recess portion and/or a protrusion portion. The automatic analyzer includes a pressing member configured to press the flow cell vertically upward from below in a state in which the recess portion and/or the protrusion portion of the flow cell is fitted to the protrusion portion and/or the recess portion of the board.

9 Claims, 11 Drawing Sheets

(56)                    References Cited

U.S. PATENT DOCUMENTS

| | | | |
|---|---|---|---|
| 2008/0260577 A1 | 10/2008 | Shirai et al. | |
| 2010/0035358 A1 | 2/2010 | Lehto et al. | |
| 2013/0052080 A1 | 2/2013 | Tanque | |
| 2014/0037515 A1* | 2/2014 | Charles | B01L 9/527 |
| | | | 29/592.1 |
| 2016/0061831 A1 | 3/2016 | Nobuki et al. | |
| 2017/0307513 A1 | 10/2017 | Bosy et al. | |
| 2018/0335389 A1* | 11/2018 | Qin | G01N 21/76 |

FOREIGN PATENT DOCUMENTS

| | | |
|---|---|---|
| JP | 2008-268069 A | 11/2008 |
| JP | 2010-539987 A | 12/2010 |
| JP | 2014-149305 A | 8/2014 |
| JP | 2014-153178 A | 8/2014 |
| JP | 2018-534567 A | 11/2018 |
| JP | 2019-515257 A | 6/2019 |

* cited by examiner

UPPER

LEFT ←——→ RIGHT

LOWER

FRONT

RIGHT ← → LEFT

REAR

AUTOMATIC ANALYZER

TECHNICAL FIELD

The present invention relates to an automatic analyzer.

BACKGROUND ART

The automatic analyzer is a device that automatically analyzes a sample such as blood or urine. As an immuno-analytical method for the detection unit of an automatic analyzer, the method in which a reaction liquid containing a sample is introduced into a flow cell and emitted light is detected by a light detector is known. This type of detection method that uses a flow cell is disclosed, for example, in Patent Literature 1.

Generally, the flow cell loaded in a conventional detection unit is fixed on the board using screws to prevent it from being out of alignment with a photomultiplier tube. By fixing the flow cell on the board using screws in this way, the light blocking effect for the area surrounded by the flow path in the flow cell and the photomultiplier tube is improved, thereby suppressing the decline in the S/N ratio at the time of signal measurement by the photomultiplier tube.

CITATION LIST

Patent Literature

Patent Literature 1: Japanese Unexamined Patent Application Publication No. 2014-149305

SUMMARY OF INVENTION

Technical Problem

However, when the flow cell is fixed on the board with screws, it is necessary to install or remove the screws each time the flow cell is loaded or unloaded. This results in a low working efficiency.

The object of the present invention is to provide an automatic analyzer that improves the working efficiency in loading or unloading a flow cell.

Solution to Problem

In order to solve the above problem, according to the present invention, an automatic analyzer includes: a photo-multiplier tube; a board disposed vertically below the pho-tomultiplier tube; and a flow cell disposed vertically below the board, in which a lower surface of the board has a protrusion portion and/or a recess portion, and an upper surface of the flow cell has a recess portion and/or a protrusion portion, and the automatic analyzer includes a pressing member configured to press the flow cell vertically upward from below in a state in which the recess portion and/or the protrusion portion of the flow cell is fitted to the protrusion portion and/or the recess portion of the board.

Advantageous Effects of Invention

According to the present disclosure, it is possible to provide an automatic analyzer that improves the working efficiency in loading or unloading a flow cell.

DESCRIPTION OF EMBODIMENTS

Hereinafter, an embodiment of the present invention will be described referring to drawings.

Figure 1:
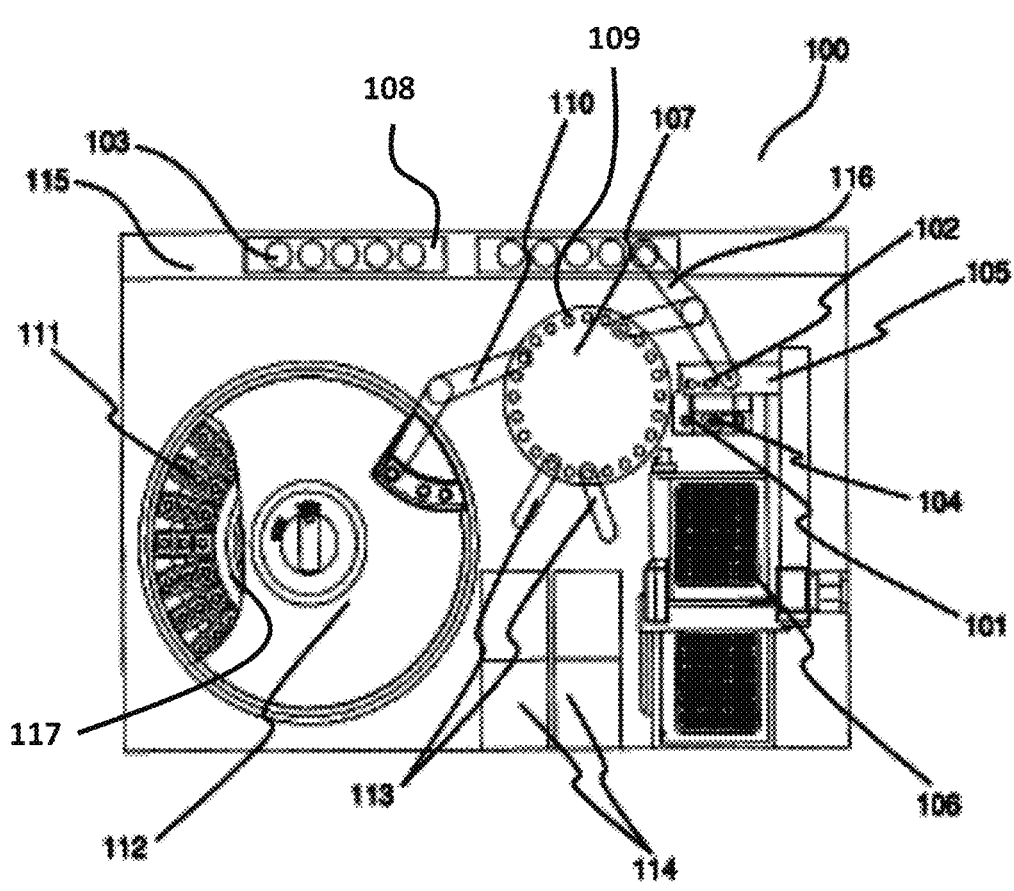
FIG. 1 is a plan view of an automatic analyzer.

First, the general configuration of an automatic analyzer will be described referring to FIG. 1. FIG. 1 is a plan view of the automatic analyzer.

The automatic analyzer 100 includes a rack 108, a rack transport line 115, a sample dispensing mechanism 116, an incubator (reaction disk) 107, a storage unit 106, a transport mechanism 105, a reaction container stirring mechanism 104, a disposal hole 102, a reagent disk 117, a reagent dispensing mechanism 110, a reaction liquid aspiration nozzle 113, a detection unit 114, and a control unit (not shown).

A sample container 103 that contains a sample is set in the rack 108.

The rack transport line 115 moves the sample container 103 set in the rack 108 to a sample dispensing position near the sample dispensing mechanism 116.

The sample dispensing mechanism 116 has an arm that rotates and moves up and down and a nozzle that aspirates and discharges the sample. A sample dispensing tip can be attached to or detached from the tip of the nozzle. The sample dispensing mechanism 116 moves its nozzle down to the sample container 103 at the sample dispensing position and aspirates a prescribed amount of sample, then rotates the arm to discharge the sample into a reaction container 109 at a prescribed position over the incubator 107.

In the incubator 107, a plurality of container holding holes in which a plurality of reaction containers 109 can be set are formed in a circumferential direction. The incubator 107 rotates to move each reaction container 109 to prescribed positions such as a reaction container set position, a reagent discharge position, a sample discharge position, and a reac-tion container disposal position.

A plurality of reaction containers 109 and sample dispensing tips that are unused are set in the storage unit 106.

The transport mechanism 105 can move in three directions, namely X axis, Y axis and Z axis directions, and transports the reaction container 109 and sample dispensing tip. For example, the transport mechanism 105 transports an unused reaction container 109 to a container holding hole at a prescribed position of the incubator 107 and transports an unused sample dispensing tip to a sample dispensing tip mounting position 101. Also, for example, the transport mechanism 105 transports the reaction container 109 to a reaction container stirring mechanism 104 and transports the reaction container 109 and sample dispensing tip that have been used, to a disposal hole 102.

The reaction container stirring mechanism 104 is a mechanism that mixes the sample in the reaction container 109 taken out of the incubator 107 and a reagent.

The disposal hole 102 is a hole to dispose of the container 109 and sample dispensing tip that have been used.

A plurality of reagent containers 111 are set in the reagent disk 117. A reagent disk cover 112 is provided over the reagent disk 117 and the inside of the reagent disk 117 is kept at a prescribed temperature. An opening portion is formed in part of the reagent disk cover 112.

The reagent dispensing mechanism 110 has an arm that rotates and moves up and down and a nozzle that aspirates and discharges a reagent. The reagent dispensing mechanism 110 immerses the tip of the nozzle in the reagent in the reagent container 111 to aspirate the reagent and discharges the aspirated reagent into the reaction container 109.

The reaction liquid aspiration nozzle 113 rotates and moves up and down to aspirate the reaction liquid mixed in the reaction container 109 on the incubator 107 and send it to the detection unit 114.

The detection unit 114 detects a specific component contained in the reaction liquid aspirated by the reaction liquid aspiration nozzle 113.

The control unit (not shown) controls operation of the whole automatic analyzer 100. The control unit receives input from an operator and outputs a control signal to various mechanisms and so on to control their operation.

Next, an explanation will be given of operation of the automatic analyzer 100.

First, the transport mechanism 105 moves to above the storage unit 106, then moves down, grips an unused reaction container 109 and moves up. After that, the transport mechanism 105 moves to above a prescribed position of the incubator 107, then moves down and sets the reaction container 109 in a container holding hole. Again, the transport mechanism 105 moves to above the storage unit 106, moves down, grips an unused sample dispensing tip and moves up. After that, the transport mechanism 105 moves to above the sample dispensing tip mounting position 101 and moves down to set the sample dispensing tip at the sample dispensing tip mounting position 101. Then, the sample dispensing mechanism 116 moves to above the sample dispensing tip mounting position 101, then moves down and presses the sample dispensing tip into the tip of the nozzle to mount it there.

The reagent dispensing mechanism 110 rotates and moves to above the opening portion of the reagent disk cover 112, then moves down, immerses the tip of the nozzle in the reagent in the reagent container 111 and aspirates a prescribed amount of reagent. Then, the reagent dispensing mechanism 110 moves up and rotates and moves to above a prescribed position of the incubator 107, and moves down to discharge the reagent into the reaction container 109.

Also, the sample dispensing mechanism 116 with the sample dispensing tip mounted thereon rotates and moves to above the sample container 103 placed in the rack 108, then moves down and aspirates a prescribed amount of sample in the sample container 103. After that, the sample dispensing mechanism 116 rotates and moves to the sample discharge position of the incubator 107, then moves down and discharges the sample into the reaction container 109 into which the reagent has been dispensed. After that, the sample dispensing mechanism 116 rotates and moves to above the disposal hole 102 and disposes of the used sample dispensing tip into the disposal hole 102.

After that, the reaction container 109 into which the sample and reagent have been discharged is moved to a prescribed position by rotation of the incubator 107 and transported to the reaction container stirring mechanism 104 by the transport mechanism 105. The reaction container stirring mechanism 104 stirs and mixes the sample and reagent by applying rotating motion to the reaction container 109. After that, the reaction container 109 is moved back to the prescribed position of the incubator 107 by the transport mechanism 105.

Next, when a given reaction time has elapsed at the prescribed position, the reaction liquid aspiration nozzle 113 moves to above the reaction container 109, then moves down and aspirates the reaction liquid in the reaction container 109. The reaction liquid aspirated by the reaction liquid aspiration nozzle 113 is analyzed by the detection unit 114.

Hereinafter, the configuration of the detection unit 114 will be described referring to FIG. 2. In the immunoanalytical field, a fluorescence method, chemiluminescence method and electrochemiluminescence method are used as analysis methods for measuring the presence and concentration of an extremely small amount of the object of measurement in the reaction liquid ($10^{-14}$ mol or less). For this embodiment, an explanation is given of an example of using the electrochemiluminescence method in which the light emitted from the reaction liquid is detected when a voltage is applied to the reaction liquid.

In the electrochemiluminescence method, a luminescent reagent is bound to the object of measurement such as a hormone by antigen-antibody reaction to determine the quantity of emitted light derived from the luminescent reagent. The measurement is performed while the reaction liquid is made to flow in the flow cell.

The detection unit 114 includes: a flow cell 209 into which the reaction liquid is introduced; a magnetic trap means that captures the magnetic particles contained in the reaction liquid; and a photomultiplier tube 211 that detects the light generated in the flow cell 209.

Figure 2:
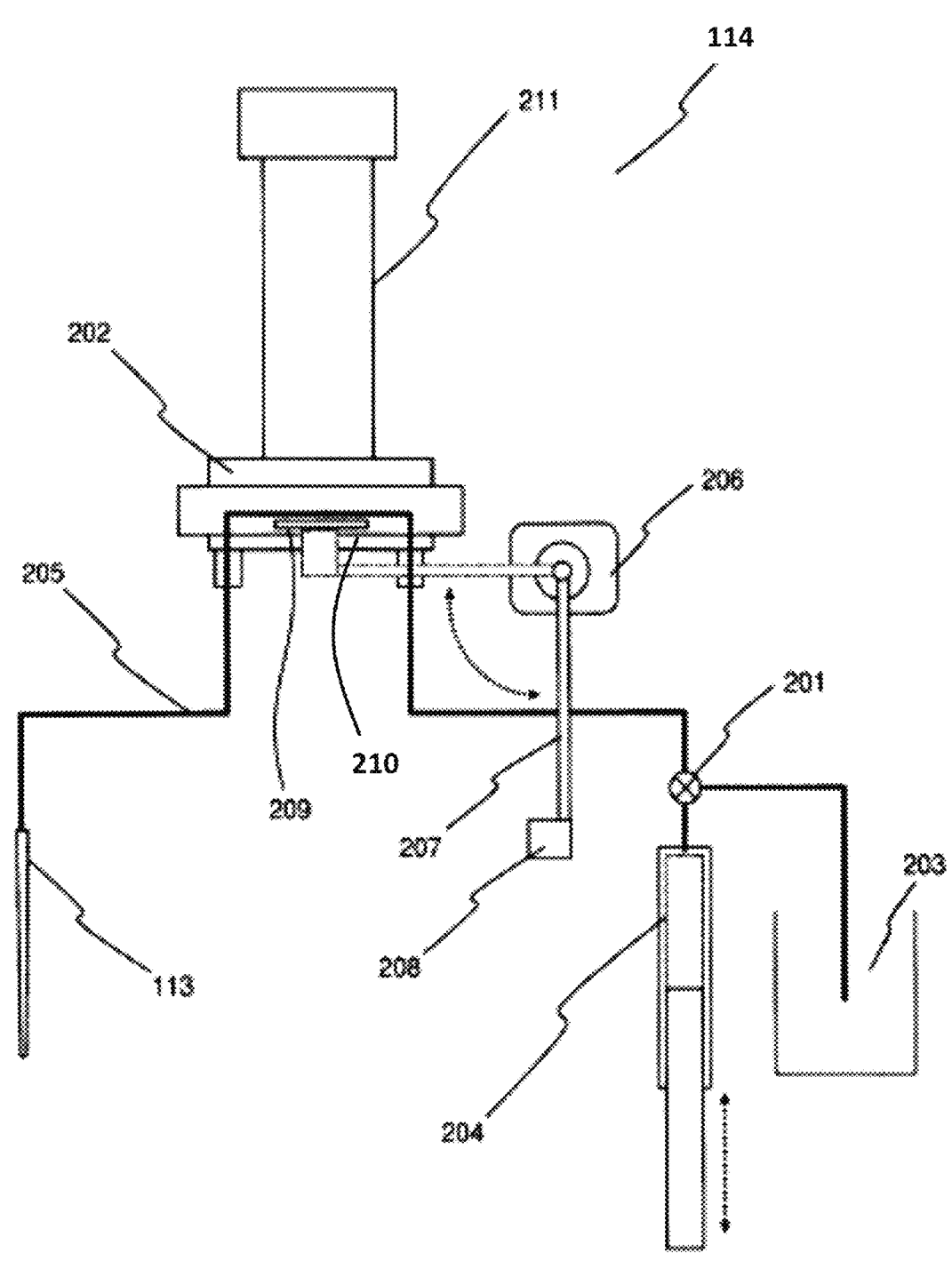
FIG. 2 is a diagram showing a flow path configuration of a detection unit.

As shown in FIG. 2, the flow path inlet side of the flow cell 209 is connected to the reaction liquid aspiration nozzle 113 through a piping 205 and its flow path outlet side is connected to a syringe 204 that generates a pressure difference to aspirate the reaction liquid, etc. and a drain 203 to discharge the reaction liquid, etc. The flow path outlet side of the flow cell 209 is bifurcated midway by a flow path switching valve 201, into one path extending to the syringe 204 and the other path extending to the drain 203. The flow cell 209 is housed in a case 202 located under the photomultiplier tube 211 and fixed on a cell frame 210.

The magnetic trap means includes a magnet for capturing magnetic particles 208, a magnet arm 207, and a magnet drive motor 206. By driving the magnet drive motor 206, the magnetic trap means rotates the magnet arm 207 to change the position of the magnet for capturing magnetic particles 208 to an operating position (position near the flow cell 209) or an escape position (position remoter from the flow cell 209).

The photomultiplier tube 211 is a light detector that is disposed above the flow cell 209. The flow cell 209 is connected to a voltage applying means (not shown). As a voltage is applied by the voltage applying means, a luminous phenomenon occurs in the magnetic particles captured in the flow cell 209. The photomultiplier tube 211 measures the intensity of light generated in the flow cell 209.

Next, an explanation will be given of the method for measuring the light intensity in the detection unit 114.

First, with the reaction liquid aspiration nozzle 113 immersed in the reaction liquid in the reaction container 109, the flow path switching valve 201 is switched so that the flow path on the drain 203 side is closed and the flow path on the flow cell 209 side is open. Then, the syringe 204 is activated toward the aspiration side to aspirate the reaction liquid in the reaction container 109, and the reaction liquid in the reaction container 109 passes through the piping 205 and flows into the flow cell 209. The reaction liquid is a mixture of the sample containing the object of measurement and the reagent (reagent containing a luminescent label, and a reagent containing magnetic particles), which forms an immune complex.

At this time, the magnet drive motor 206 is driven to rotate the magnet arm 207 90 degrees, so the magnet for capturing magnetic particles 208 at the tip of the magnet arm 207 comes to just below the flow cell 209 (moves to the operating position). Consequently, the magnetic particles in the reaction liquid passing through the flow cell 209 are magnetically captured by the flow cell 209.

After that, the reaction liquid aspiration nozzle 113 moves to a container that contains an auxiliary liquid for luminescent reaction and with the nozzle 113 immersed in the auxiliary liquid for luminescent reaction, the syringe 204 is activated toward the aspiration side. Consequently, the auxiliary liquid for luminescent reaction flows into the flow cell 209 and while the immune complex remains magnetically captured, the residual reaction liquid in the flow cell 209 is substituted by the auxiliary liquid for luminescent reaction.

Then, after the syringe 204 stops moving, the magnet drive motor 206 is driven in the opposite direction and the magnet arm 207 rotates backward 90 degrees, so the magnet for capturing magnetic particles 208 moves away from the flow cell 209 (moves to the escape position).

Then, the photomultiplier tube 211 measures the dark current output signal in the flow cell 209 through a light transmission window formed in the upper surface of the flow cell 209. After that, a voltage is applied to the inside of the flow cell 209 by the voltage applying means so that electrochemical luminescent reaction of the luminescent label contained in the immune complex is induced. At this time, the photomultiplier tube 211 measures the light intensity through the light transmission window and determines the quantity of the object of measurement contained in the immune complex.

After measurement of the light intensity, the reaction liquid aspiration nozzle 113 moves to a container containing a cleaning liquid and with the nozzle 113 immersed in the cleaning liquid, the syringe 204 is activated toward the aspiration side. Consequently, the cleaning liquid flows into the piping 205 and flow cell 209, and the reaction liquid and auxiliary liquid for luminescent reaction that are remaining in the piping 205 and flow cell 209 are removed to clean the piping 205 and flow cell 209.

Lastly, the flow path switching valve 201 is switched to close the flow path on the flow cell 209 side and open the flow path on the drain 203 side. Then, the syringe is activated toward the discharge side, and the reaction liquid, auxiliary liquid for luminescent reaction and cleaning liquid that are remaining in the syringe 204 are discharged into the drain 203.

By carrying out the above steps repeatedly, analysis is made on a plurality of samples for a plurality of analysis items.

Figure 3:
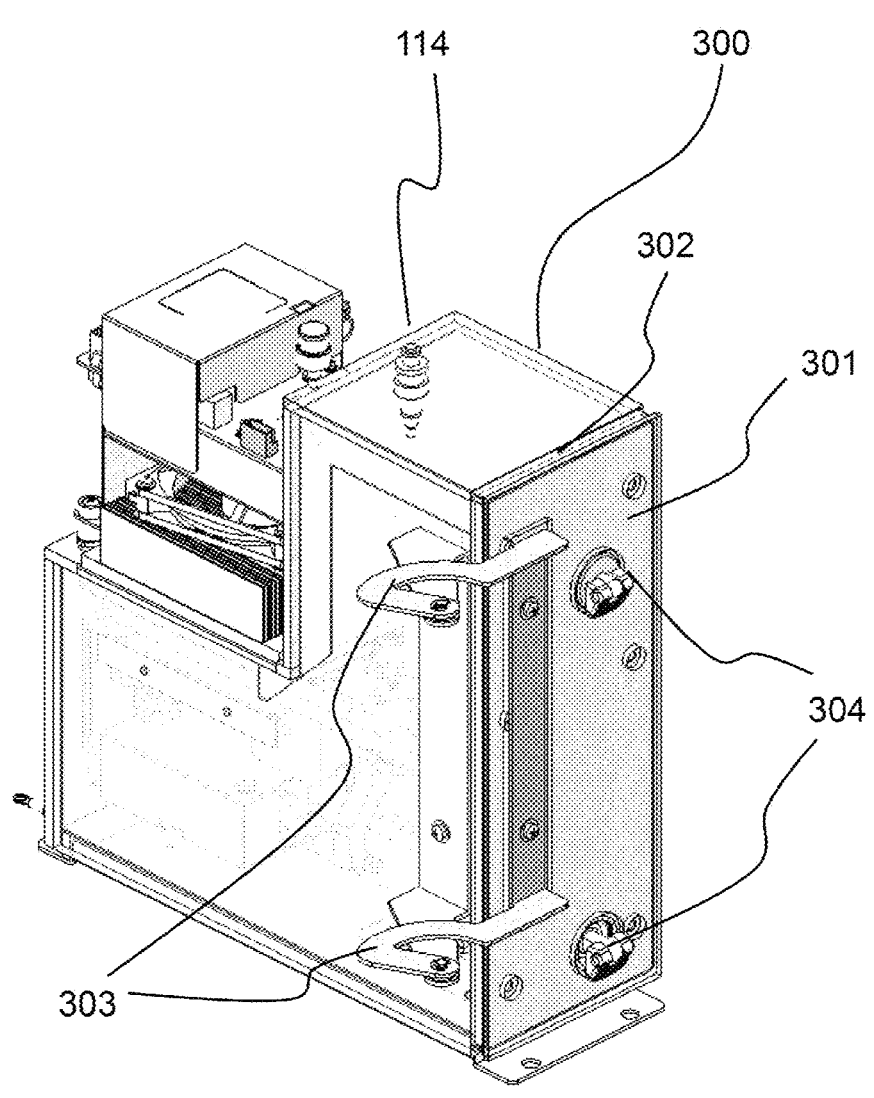
FIG. 3 is a perspective view showing an appearance of the detection unit.

FIG. 3 is a perspective view showing the appearance of the detection unit 114. The detection unit 114 incorporates the flow cell 209, photomultiplier tube 211 and so on. In an immune assay based on the electrochemiluminescence method, the photomultiplier tube 211 receives the very weak light generated by luminescent reaction of the luminescent label contained in the immune complex in the flow cell 209 under a low noise condition, and picks it up as an electric signal. Therefore, in order to block the external light as a main reason for the decline in the S/N ratio at the time of signal measurement by the photomultiplier tube 211, the housing 300 of the detection unit 114 and the lid 301 are made of a light-blocking material and has a hermetically sealed structure.

The lid 301 is connected to the housing 300 by hinges 303, and tightening jigs 304 that fix the lid 301 in the closed state are provided as position fixing members on the lid 301. Therefore, when opening or closing the lid 301, work for installing and removing screws is not needed, so loading and unloading of the flow cell 200 can be carried out easily in a short time.

In addition, a sealing member is provided all along the peripheral edge of the opening portion 302 of the housing 300, namely the front end of the side wall of the housing 300. The material of the sealing member is not limited as far as it is a material that has cushioning and heat-insulating properties, such as black soft rubber or soft polyurethane. The sealing member may be located on the back side of the lid 301 and at a position facing the front end of the side wall of the housing 300. Since the detection unit 114 has a sealing member like this, the sealability is improved and thus penetration of external light or temperature change due to inflow of external air can be prevented.

The tightening jig 304 may be another type of fixing member such as a hook, as far as it can press the lid 301 against the sealing member between the housing 300 and lid 301 to fix the position of the lid 301. Also, the tightening jig 304 may be located in the housing 300 so that its position changes with respect to the lid 301 from the housing 300 side for locking. However, if it is structured to fix the lid 301 in the closed state by a magnetic force, an immune assay may be given by an immunoanalytical electrochemiluminescence method based on the electrochemiluminescence method that uses the magnetic trap means and photomultiplier tube 211. For this reason, it is desirable that the fixing member should be made of a non-magnetic material and configured to tighten the lid 301 and housing 300 mechanically.

Figure 4:
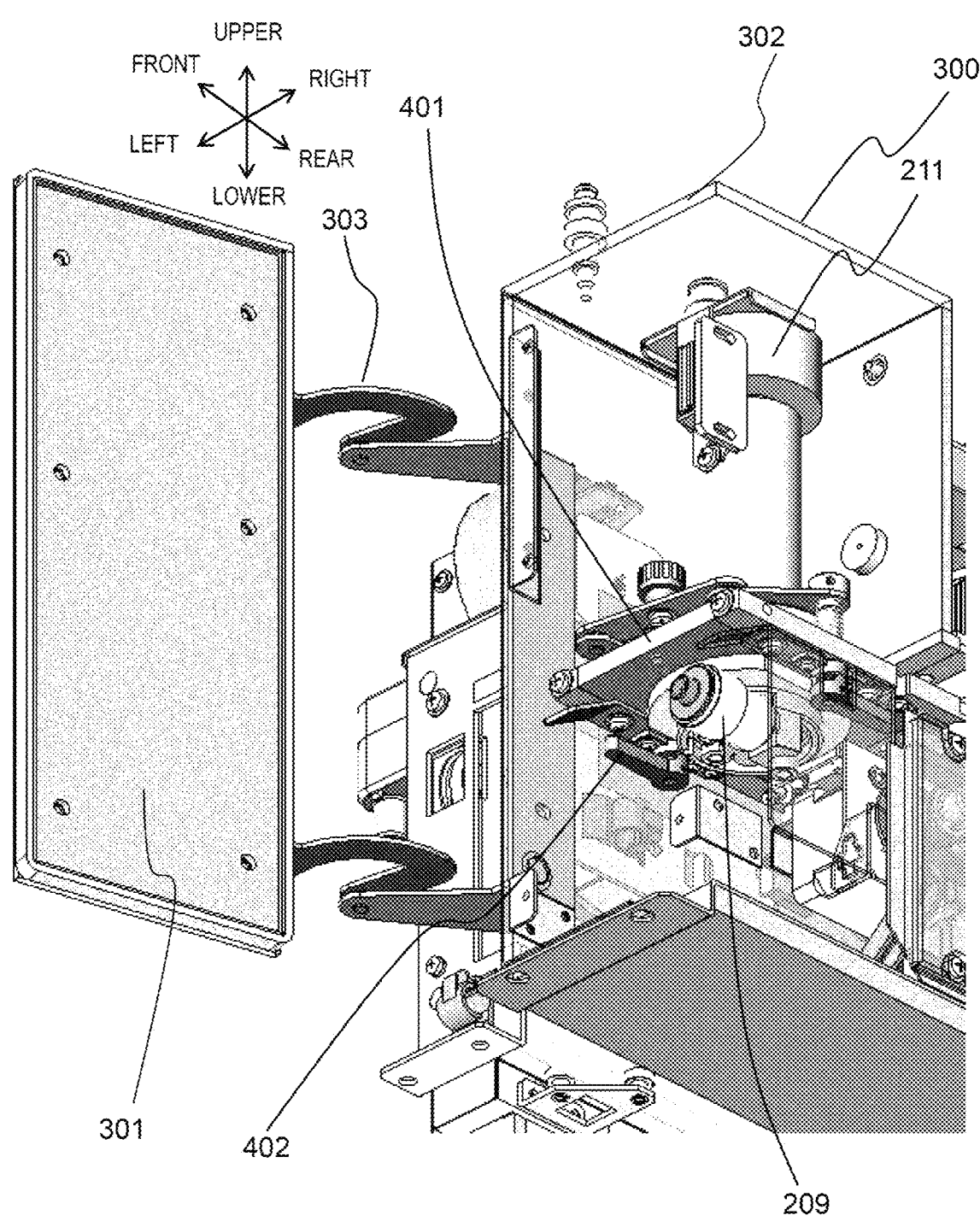
FIG. 4 is a perspective view showing an internal structure of the detection unit (a state in which a flow cell is mounted).

FIG. 4 is a perspective view showing the internal structure of the detection unit 114 in a state in which the flow cell 209 is mounted. As shown in FIG. 4, the detection unit 114 includes a photomultiplier tube 211, a board 401 disposed vertically below the photomultiplier tube 211, and a flow cell 209 disposed vertically below the board. In addition, the lower surface of the flow cell 209 is pressed vertically upward from below by a pressing member 402, so the flow cell 209 and photomultiplier tube 211 closely contact each other, thereby improving the light blocking effect in the area surrounded by the flow path in the flow cell 209 and the photomultiplier tube 211. Particularly, the pressing member 402 presses the flow cell 209 at several spots, so the sealability of the flow cell 209 and the photomultiplier tube 211 is further improved. Since the flow cell 209 is fixed on the board 401 by the pressing member 402, the flow cell 209 can be loaded and unloaded more easily than when screws or the like are used to fix it.

Figure 5:
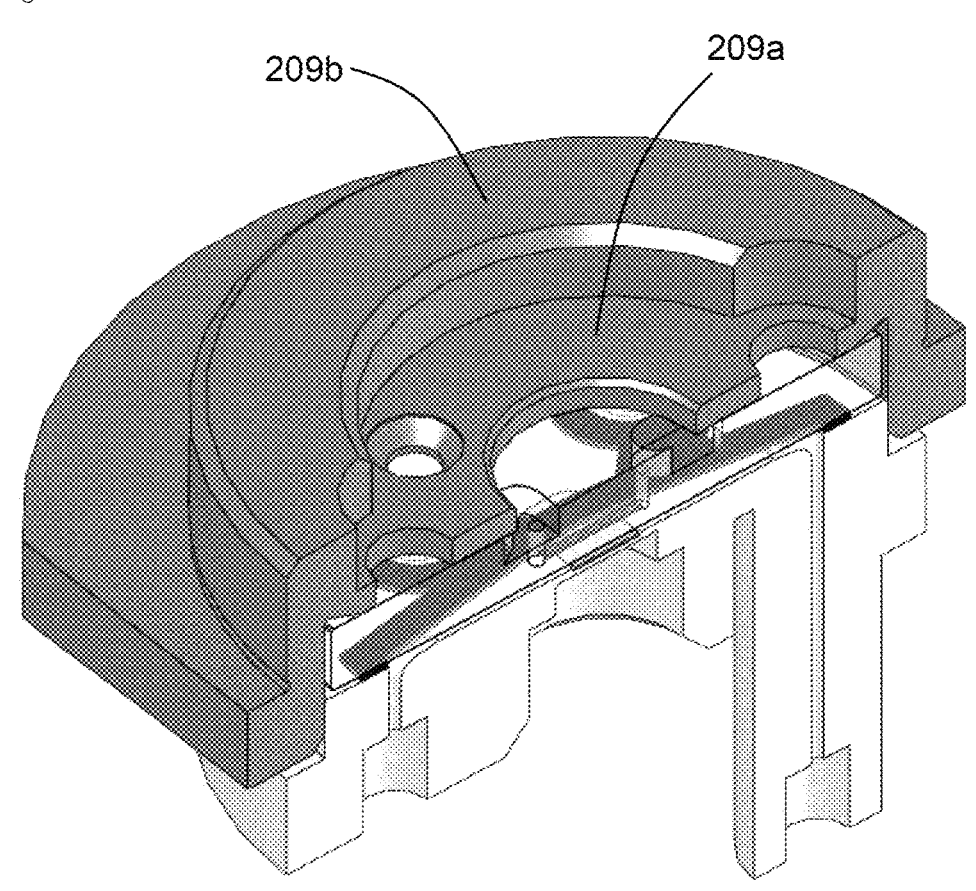
FIG. 5 is a cross-sectional perspective view of the flow cell.

FIG. 5 is a cross-sectional perspective view of the flow cell 209. As shown in FIG. 5, on the upper surface of the flow cell 209, a recess portion 209*a* is formed in a circular shape on the inner circumferential side and a protrusion portion 209*b* is formed in a circumferential shape on its outer circumferential side. Two positioning holes are formed on the outer circumferential side of the protrusion portion 209*b* of the flow cell 209 at specific positions in the circumferential direction.

Figure 6:
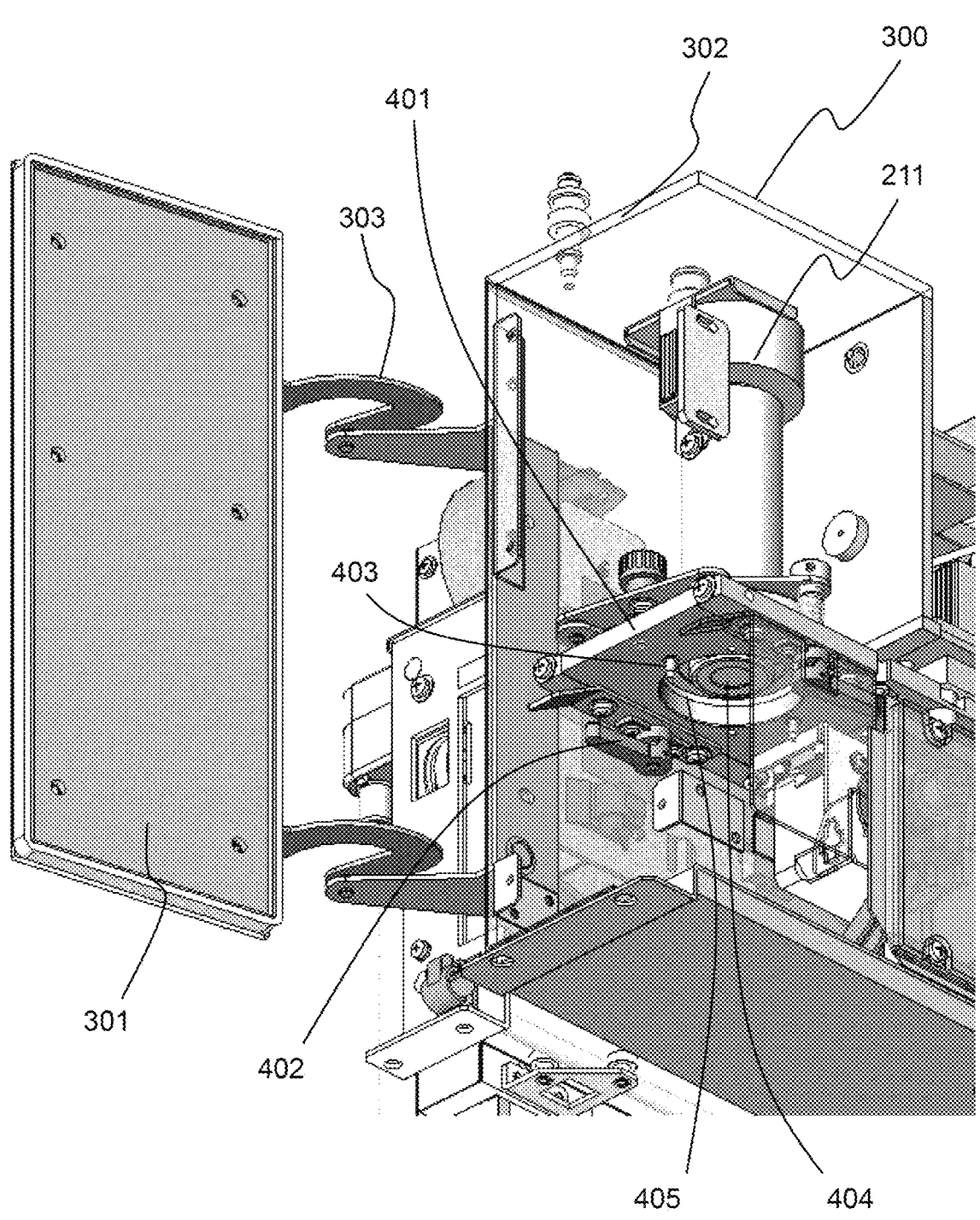
FIG. 6 is a perspective view showing an internal structure of the detection unit (a state before mounting the flow cell).

FIG. 6 is a perspective view of the internal structure of the detection unit 114, showing a state before the flow cell 209 is loaded. As shown in FIG. 6, on the lower surface of the board 401, a protrusion portion 404 is formed in a circular shape on the inner circumferential side and a recess portion 405 is formed in a circumferential shape on its outer circumferential side. In addition, on the lower surface of the board 401, a positioning pin 403 that extends vertically downward from a specific position in the circumferential direction is provided outside the recess portion 405. The positioning pin 403 is disposed at two symmetrical positions with respect to the center of the protrusion portion 404.

When attaching the flow cell 209 to the board 401, first the recess portion 209*a* of the flow cell 209 is fitted to the protrusion portion 404 of the board 401 and the protrusion portion 209*b* of the flow cell 209 is fitted to the recess portion 405 of the board 401. Then, the positioning holes of the flow cell 209 are inserted to the positioning pins 403 of the board 401 to fix the position of the flow cell 209 with respect to the board 401. After that, as shown in FIG. 4, a plurality of pressing members 402 are pressed against the lower surface of the flow cell 209 so that the flow cell 209 is fixed on the board 401 in axial alignment with the photomultiplier tube 211.

Figure 7:
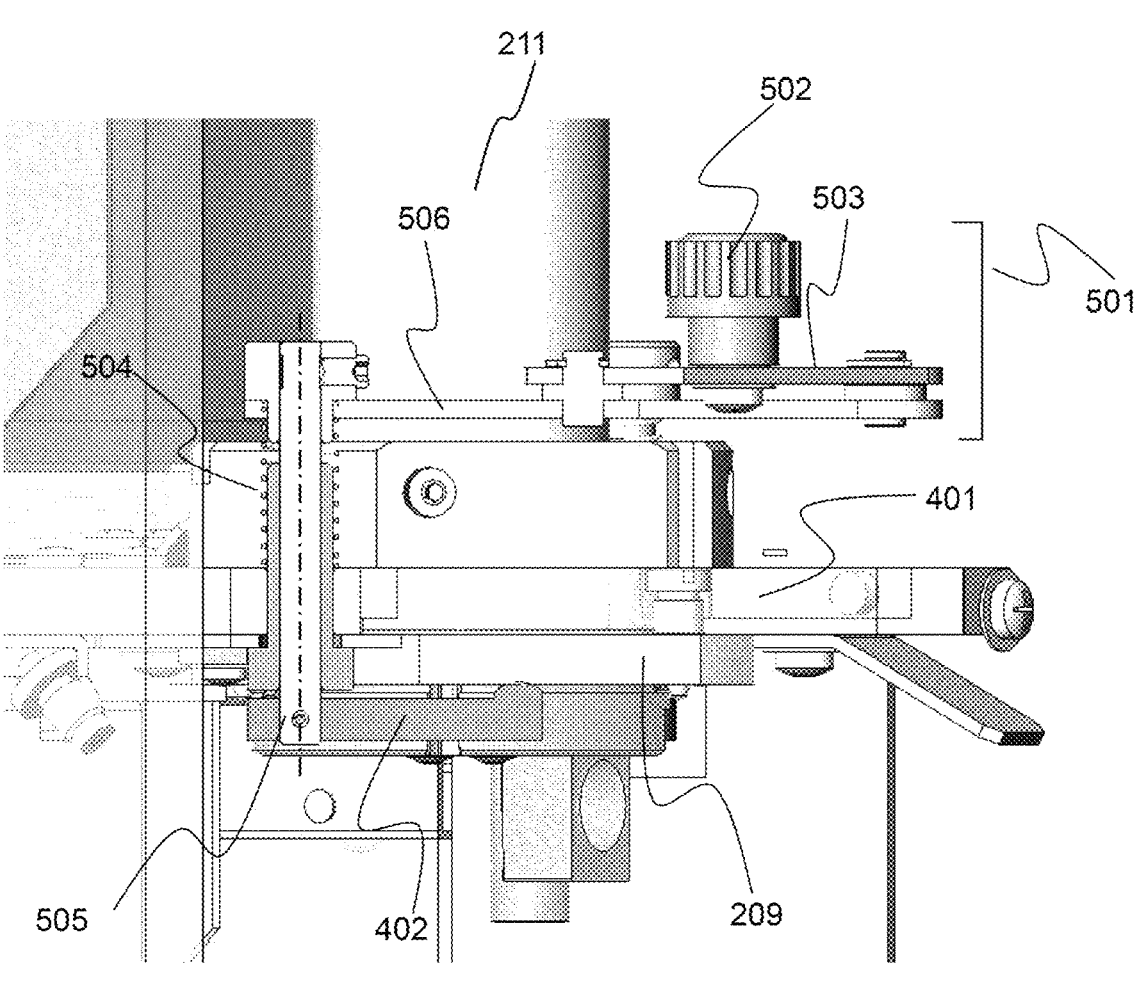
FIG. 7 is a front view showing a configuration of an interlocking mechanism that interlocks operations of a pressing member.

FIG. 7 is a front view showing the configuration of an interlocking mechanism 501 that interlocks operations of the two (left and right) pressing members 402. The interlocking mechanism 501 includes an operation knob 502, a connecting plate 503, and an arm 506. As the operator holds and slides the operation knob 502 horizontally in a prescribed direction, the pressing members 402 are moved simultaneously and symmetrically through the connecting plate 503 and arm 506 and the two pressing members 402 press the flow cell 209 simultaneously. Since the two pressing members 402 can be pressed or released simply by moving the operation knob 502, it is easy to load or unload the flow cell 209.

The pressing member 402 has a pressing portion on the upper surface of its tip and the pressing portion presses the lower surface of the flow cell 209. In order to suppress scratching called chipping on the flow cell 209 when it is pressed, it is desirable that the pressing member 402 should be made of a material excellent in abrasion resistance and slidability, as typified by polyacetal resin. For the pressing force of the pressing member 402, the spring force of a pressing pressure spring 508 attached to a SUS shaft 505 that connects the arm 506 and pressing member 402 is used.

Next, how the pressing member 402 locks the flow cell 209 will be concretely explained.

Figures 8A, 8B, 8C:
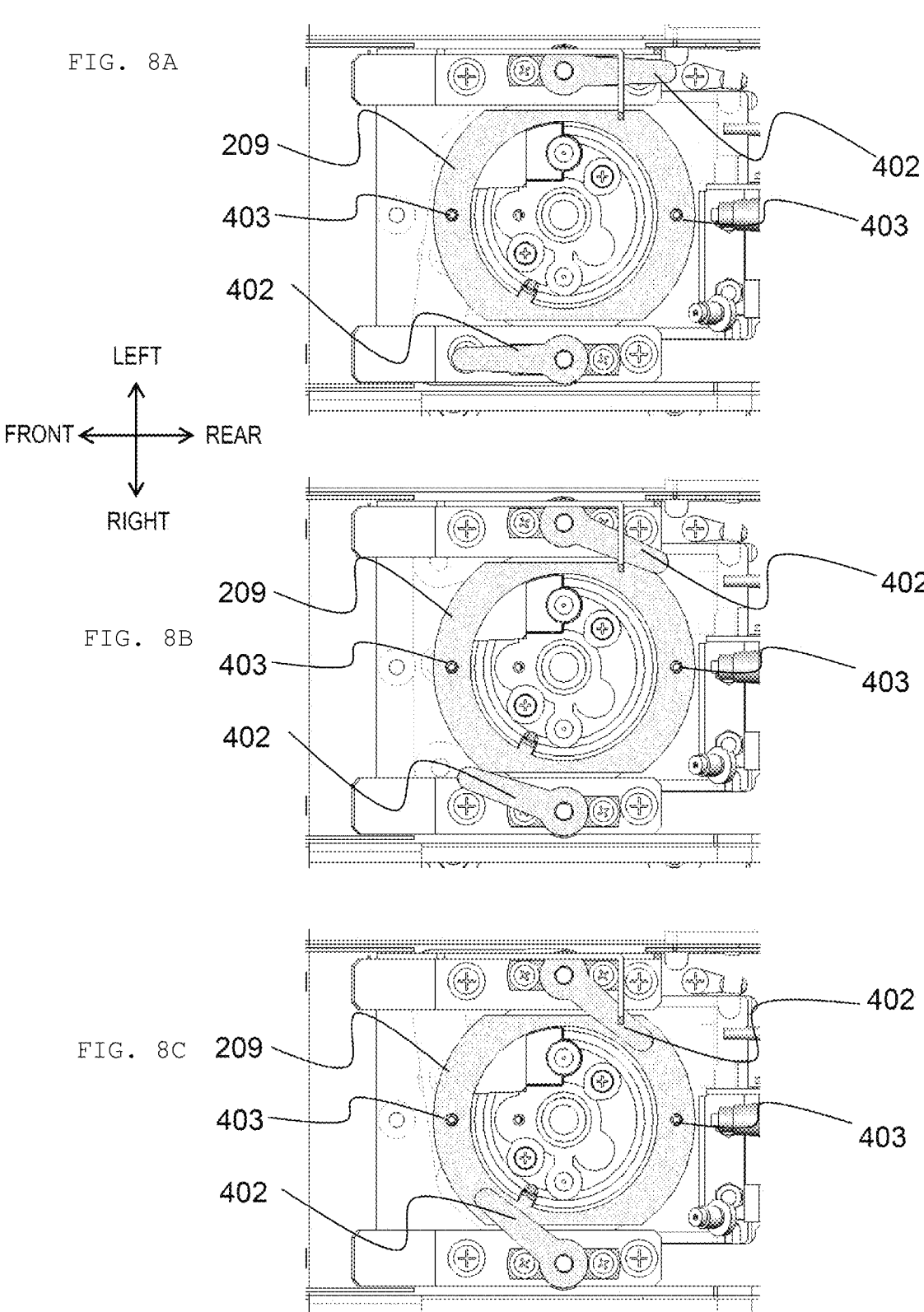
FIGS. 8A-8C are a plan view showing a state in which left and right pressing members simultaneously press the flow cell.

FIGS. 8A-8C are a plan view showing a state in which the two (left and right) pressing members 402 press the flow cell 209 simultaneously. FIG. 8A shows a state in which the pressing members 402 are in the escape state, FIG. 8B shows a state in which the pressing members 402 are moving for locking, and FIG. 8C shows a state in which locking motion by the pressing members 402 is completed.

Figures 9A, 9B, 9C:
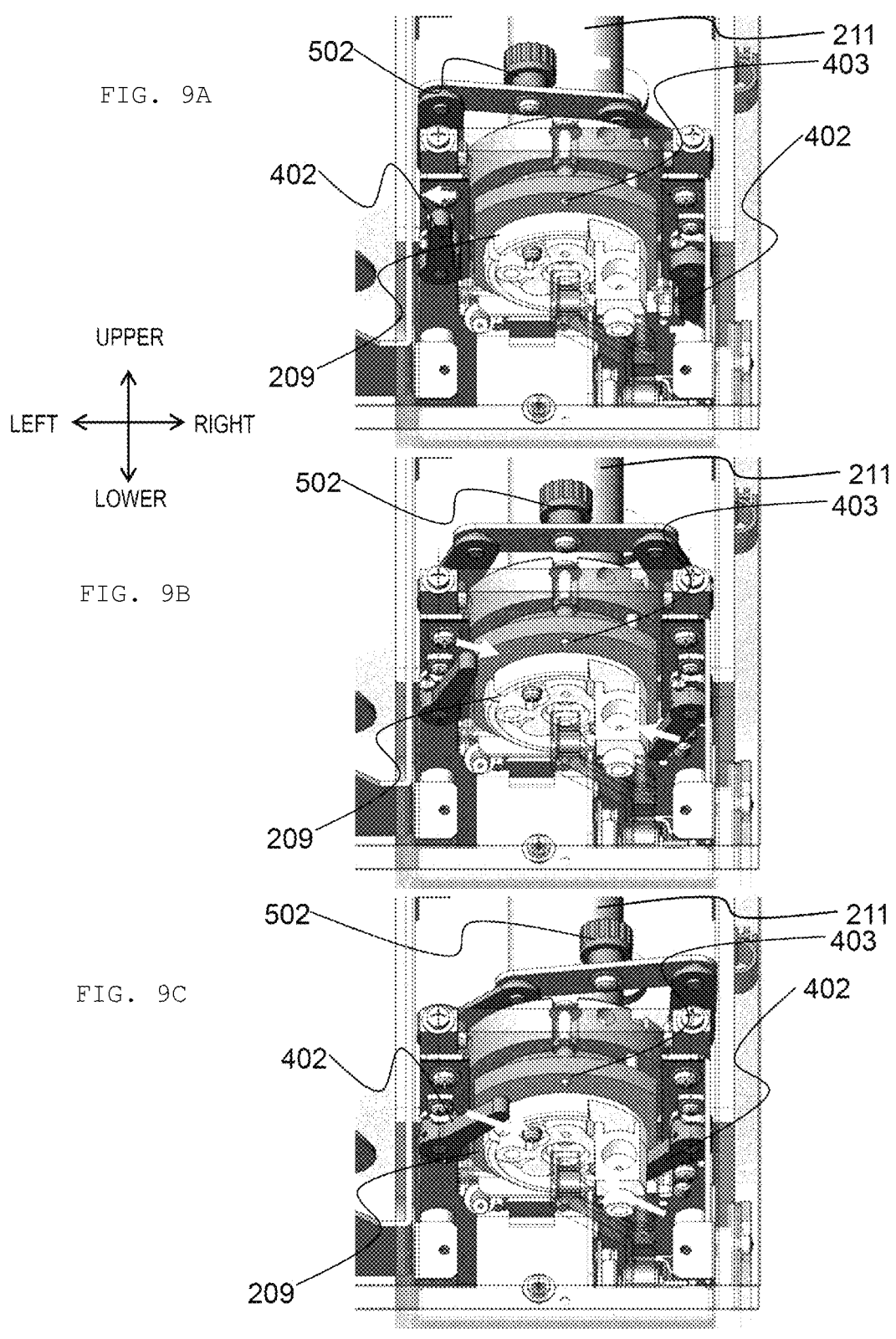
FIGS. 9A-9C are a perspective view as viewed from below showing a state in which the left and right pressing members simultaneously press the flow cell.

FIGS. 9A-9C are a perspective view showing a state in which the two (left and right) pressing members 402 press the flow cell 209 simultaneously, as viewed from below. FIG. 9A shows a state in which the pressing members 402 are in the escape state, FIG. 9B shows a state in which the pressing members 402 are moving for locking, and FIG. 9C shows a state in which locking motion by the pressing members 402 is completed.

First, when the pressing members 402 are in the escape state as shown in FIG. 8A and FIG. 9A, the flow cell 209 is attached from below the board 401 with the recess and protrusion portions fitted to each other on the contact surface, and the positioning pins 403 are inserted into the positioning holes of the flow cell 209.

Then, as the operation knob 502 is slid to the right, the process proceeds from the state as shown in FIG. 8B and FIG. 9B in which the movement for locking is under way, to the state as shown in FIG. 8C and FIG. 9C in which the lower surface of the flow cell 209 is pressed by the two pressing members 402 to lock the flow cell 209 completely. As the operation knob 502 is slid to the right horizontally, the pressing spring 508 pushes up the pressing member 402. At this time, the left pressing member 402 presses the left side with respect to the center of the flow cell 209 and the right pressing member 402 presses the right side with respect to the center of the flow cell 209. This suppresses the imbalance between the left and right pressing forces on the flow cell 209, thereby improving the light blocking effect for the area surrounded by the flow path in the flow cell 209 and the photomultiplier tube 211. Furthermore, since the left and right pressing members 402 press the flow cell 209 simultaneously, the imbalance between the pressing forces is suppressed and a positioning error is prevented, thereby contributing to improvement in the light blocking effect.

As explained above, according to this embodiment, the flow cell 209 can be loaded and unloaded without using screws and without taking out the board 401.

Next, a variation of the embodiment will be described referring to FIGS. 10A-10B and FIGS. 11A-11F. In the variation, guide members 804 that guide the positioning hole of the flow cell 209 to the position of the positioning pin 403 of the board 401 are provided on the left and right of the detection unit 114. These guide members 804 are curved horizontally along the outer shape of the flow cell 209 to facilitate positioning of the flow cell 209.

Next, how pressing members 809 according to the variation lock the flow cell 209 will be concretely explained.

Figures 10A, 10B:
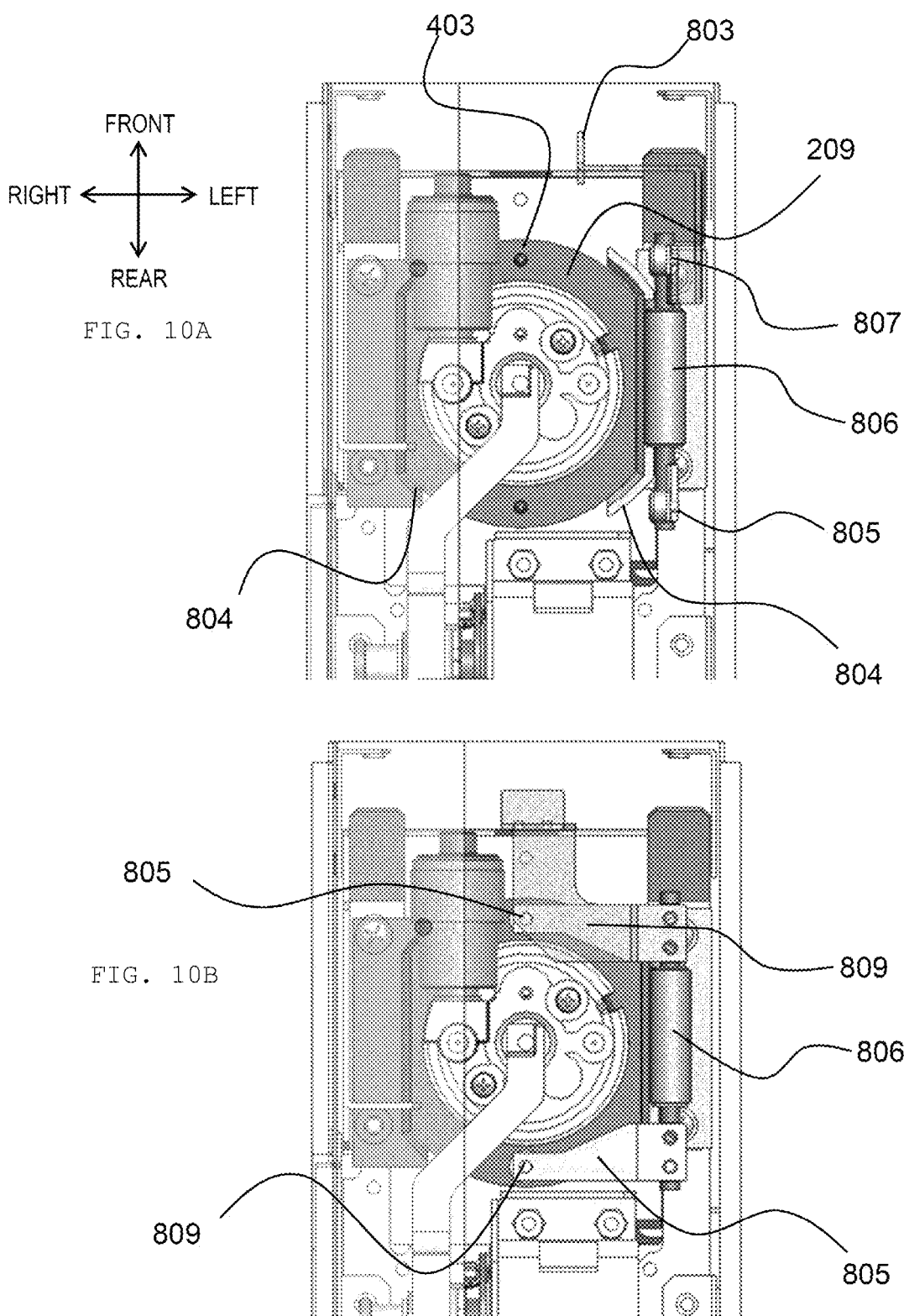
FIGS. 10A-10B are a plan view showing a state in which front and rear pressing members simultaneously press the flow cell.

FIGS. 10A-10B are a plan view showing a state in which the two (front and rear) pressing members 809 (leaf springs 805) press the flow cell 209 simultaneously. FIG. 10A shows a state in which the pressing members 809 are in the escape state and FIG. 10B shows a state in which locking motion by the pressing members 809 is completed.

Figures 11A, 11B, 11C, 11D, 11E, 11F:
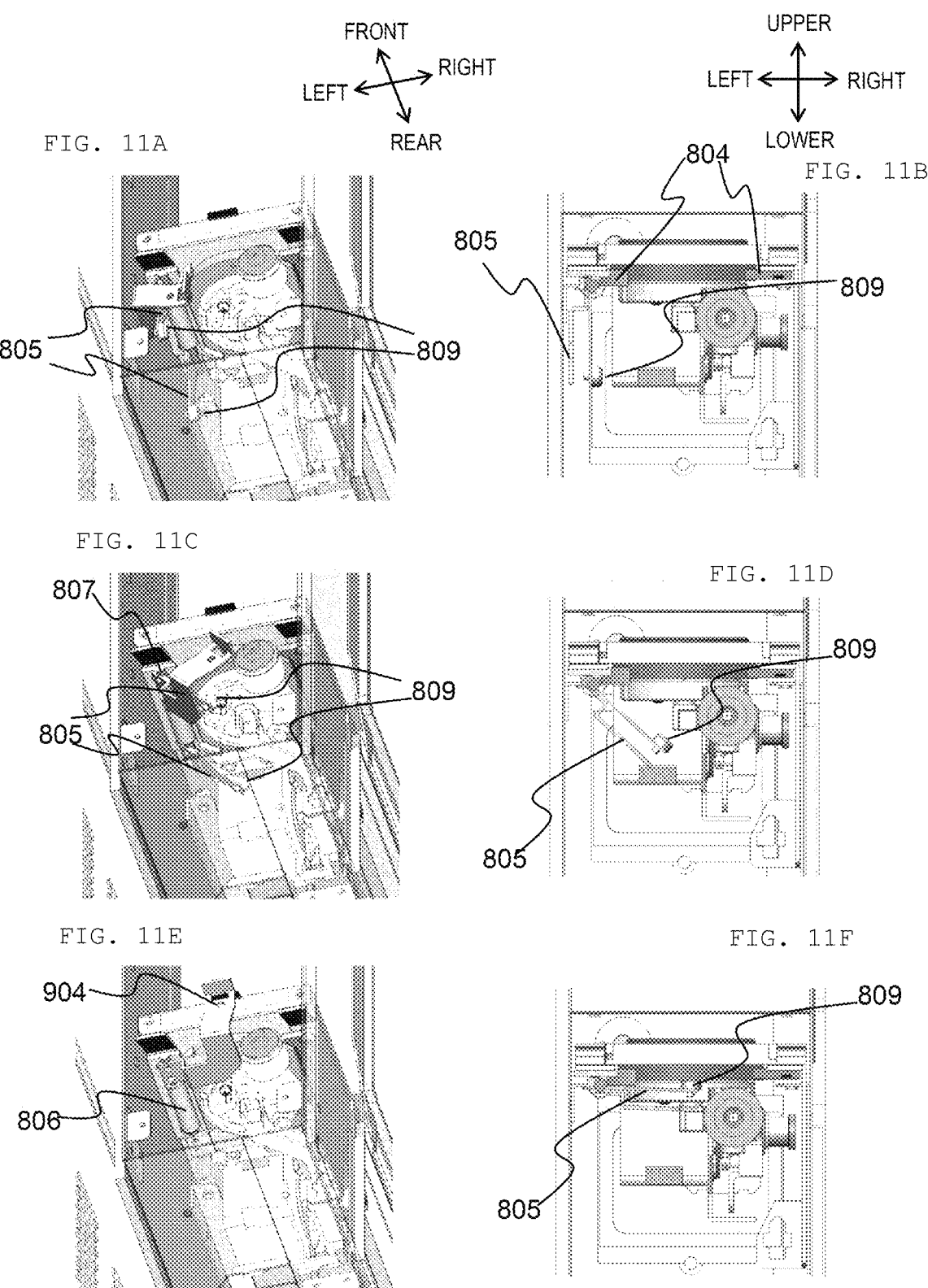
FIGS. 11A-11F are a perspective view as viewed from below and a front view as viewed from the front showing a state in which the front and rear pressing members simul-taneously press the flow cell.

FIGS. 11A-11F are a perspective view showing a state in which the front and rear pressing members 809 press the flow cell 209 simultaneously as viewed from below, and a front view of the pressing members 809 as viewed from the front. FIG. 11A and FIG. 11B show a state in which the pressing members 809 are in the escape state, FIG. 11C and FIG. 11D show a state in which the pressing members 809 are moving for locking, and FIG. 11E and FIG. 11F show a state in which locking motion by the pressing members 809 is completed.

First, in the escape state as shown in FIG. 10A, FIG. 11A and FIG. 11B, the flow cell 209 is inserted from the front side of the board 401 below the board 401 along the guide members 804 and the positioning pin 403 of the board 401 is inserted into the positioning hole of the flow cell 209. Since the guide member 804 is to be in contact with the flow cell 209, in order to prevent chipping it is desirable that it should be made of a material excellent in abrasion resistance and slidabililty, as typified by polyacetal.

After that, as an operation lever 803 of the interlocking mechanism to interlock the movements of the two (front and rear) pressing members 809 is rotated, the process proceeds from the state as shown in FIG. 11C and FIG. 11D in which movement for locking is under way, to the state as shown in FIG. 10B, FIG. 11E and FIG. 11F in which the lower surface of the flow cell 209 is pressed by the two pressing members 809 to lock the flow cell 209 completely. Furthermore, if it is known in advance that the flow cell 209 will remain loaded for a long time, it can be fixed more stably by fixing it at a fixed position 904 using a screw after completion of its locking, as shown in FIG. 11E.

Here, the operation lever 803 is connected to the front leaf spring 805 through a rotating shaft 807 and the front leaf spring 805 and the rear leaf spring 805 are connected by a bearing portion 806, so the front and rear pressing members 809 are moved simultaneously by rotation of the operation lever 803. The spring force of the leaf spring 805 is used for the pressing force of the pressing member 809. Since the pressing member 809 is to be in contact with the flow cell 209, in order to prevent chipping it is desirable that it should be made of a material excellent in abrasion resistance and slidabililty, as typified by polyacetal.

According to the variation, the front pressing member 809 presses the front side with respect to the center of the flow cell 209 and the rear pressing member 809 presses the rear side with respect to the center of the flow cell 209. This suppresses the imbalance between the front and rear pressing forces, thereby improving the light blocking effect for the area surrounded by the flow path in the flow cell 209 and the photomultiplier tube 211. Furthermore, since the front and rear pressing members 809 press the flow cell 209 simultaneously, the imbalance between the pressing forces is suppressed and a positioning error is prevented, thereby contributing to improvement in the light blocking effect.

The above embodiment has been described by taking as an example the detection unit 114 that is used for immune assay based on the electrochemiluminescence method. The hinge structure in this embodiment can be applied to a detection unit that is used in other types of analysis methods such as the fluorescence method and chemiluminescence method. The number of pressing members and their positions given here are merely one example and not limited to the above embodiment.

REFERENCE SIGN LIST

100: automatic analyzer
101: sample dispensing tip mounting position
102: disposal hole
103: sample container
104: reaction container stirring mechanism
105: transport mechanism
106: storage unit
107: incubator

108: rack
109: reaction container
110: reagent dispensing mechanism
111: reagent container
112: reagent disk cover
113: reaction liquid suction nozzle
114: detection unit
115: rack transport line
116: sample dispensing mechanism
117: reagent disk
201: flow path switching valve
202: case
203: drain
204: syringe
205: piping
206: magnet drive motor
207: magnet arm
208: magnet for capturing magnetic particles
209: flow cell
209*a*: recess portion
209*b*: protrusion portion
211: photomultiplier tube
301: lid
302: opening portion
303: hinge
304: tightening jig
401: board
402: pressing member
403: positioning pin
404: protrusion portion
405: recess portion
501: interlocking mechanism
502: operation knob
503: connecting plate
504: pressing spring
505: SUS shaft
506: arm
803: operation lever
804: guide member
805: leaf spring
806: bearing portion
807: rotating shaft
809: pressing member
904: fixed position

The invention claimed is:

1. An automatic analyzer, comprising:
a photomultiplier tube;
a board disposed vertically below the photomultiplier tube and comprising a lower board surface;
a pressing member; and
a flow cell disposed vertically below the board and comprising a upper cell surface and a lower cell surface,
wherein the lower board surface of the board has a first protrusion portion or a first recess portion, and
wherein the cell upper surface of the flow cell has a second recess portion or a second protrusion portion, and
wherein the pressing member configured to contact the lower cell surface and press the flow cell vertically upward toward the board from below and fit the second protrusion portion into the first recess portion or the second recess portion onto the first protrusion portion to fit the flow cell onto the board,
wherein the flow cell comprises the second recess portion and the second protrusion portion, wherein the second recess portion comprises a circumferential shape on an inner circumferential area of the upper cell surface, and wherein the second protrusion portion comprises a circumferential shape on an outer circumferential area of the upper cell surface.

2. The automatic analyzer according to claim 1, wherein the pressing member contacts the lower cell surface and presses the flow cell at a plurality of places to secure the fit of the flow cell onto the board.

3. The automatic analyzer according to claim 1, wherein the pressing member is configured to press a first area of the lower cell surface and a second area of the lower cell surface, and wherein the first area is opposite the second area with respect to a center of the lower cell surface of the flow cell.

4. The automatic analyzer according to claim 1, further comprising:

a plurality of the pressing members including the pressing member; and an interlocking mechanism configured to interlock operations of the plurality of pressing members, wherein the plurality of pressing members are configured to simultaneously contact the lower cell surface and press the flow cell vertically upward toward the board by the interlocking mechanism to secure the fit of the flow cell onto the board.

5. The automatic analyzer according to claim 1, wherein the second recess portion or the second protrusion portion of the flow cell and the first protrusion portion or the recess first portion of the board are formed in circumferential shapes, wherein the board includes a positioning pin extending vertically downward toward a fuel cell, and wherein the flow cell has a positioning hole into which the positioning pin is received as the flow cell is fitted and pressed onto the board.

6. The automatic analyzer according to claim 5, wherein the automatic analyzer comprises a guide member configured to guide the positioning hole of the flow cell to a position of the positioning pin of the board.

7. The automatic analyzer according to claim 1, wherein the pressing member presses the a fuel cell vertically upward from below to cause contact between the flow cell and the photomultiplier tube that enables an improved light blocking effect.

8. The automatic analyzer according to claim 1, wherein an outer circumferential area of the upper cell surface comprises two or more positioning holes including the positioning hole.

9. The automatic analyzer according to claim 1, wherein the lower board surface comprises two or more positioning pins including the positioning pin.

* * * * *